United States Patent
Lukes

(10) Patent No.: US 10,260,605 B2
(45) Date of Patent: Apr. 16, 2019

(54) TRACTION MEANS TENSIONER, VIBRATION WELDING DEVICE HAVING A TRACTION MEANS TENSIONER AS WELL AS PRODUCTION METHOD FOR A TRACTION MEANS TENSIONER

(71) Applicant: BRANSON ULTRASCHALL Niederlassung der Emerson Technologies GmbH & Co. OHG, Dietzenbach (DE)

(72) Inventor: Zbyněk Lukes, Borovce (SK)

(73) Assignee: BRANSON ULTRASCHALL Niederlassung der Emerson Technologies GmbH & Co. OHG, Dietzenbach (DE)

( * ) Notice: Subject to any disclaimer, the term of this patent is extended or adjusted under 35 U.S.C. 154(b) by 0 days.

(21) Appl. No.: 15/802,646

(22) Filed: Nov. 3, 2017

(65) Prior Publication Data

US 2018/0051781 A1 Feb. 22, 2018

Related U.S. Application Data

(62) Division of application No. 14/471,155, filed on Aug. 28, 2014, now Pat. No. 9,835,234.

(30) Foreign Application Priority Data

Aug. 29, 2013 (DE) .......................... 10 2013 217 272

(51) Int. Cl.
*B32B 37/00* (2006.01)
*F16H 19/06* (2006.01)
(Continued)

(52) U.S. Cl.
CPC ......... *F16H 19/0672* (2013.01); *B23K 20/10* (2013.01); *B29C 65/7841* (2013.01);
(Continued)

(58) Field of Classification Search
CPC .. B23K 20/10; B29C 65/7841; F16H 19/0672
(Continued)

(56) References Cited

U.S. PATENT DOCUMENTS

| 3,429,028 A | 2/1969 | Maropis et al. |
| 4,456,233 A | 6/1984 | Muller |

(Continued)

FOREIGN PATENT DOCUMENTS

| CN | 1656328 A | 8/2005 |
| CN | 102216650 A | 10/2011 |

(Continued)

OTHER PUBLICATIONS

EP Extended Search Report for EP Application No. 14002960.4 dated Aug. 6, 2015 (7 pages).

(Continued)

*Primary Examiner* — James D Sells
(74) *Attorney, Agent, or Firm* — Reising Ethington P.C.

(57) ABSTRACT

With the traction mechanism tensioner, a traction mechanism having at least two ends is tensionable. The traction mechanism tensioner comprises a first fastener, a second fastener and a coupler. The first fastener has a first fastening portion at which the first end of the traction mechanism as fastenable. The second fastener has a second fastening portion at which the second end of the traction mechanism is fastenable. The coupling means couples the first and the second fasteners to each other so that the first and the second fasteners are movable with respect to each other and their movability is at least restricted on one side. Further, the first and the second fasteners are pre-tensionable with respect to each other via at least one spring element.

8 Claims, 10 Drawing Sheets

(51) Int. Cl.
  *B29C 65/78* (2006.01)
  *B23K 20/10* (2006.01)
  *B29C 65/00* (2006.01)
  *B29C 65/06* (2006.01)

(52) U.S. Cl.
  CPC .......... *B29C 65/06* (2013.01); *B29C 66/822* (2013.01); *B29C 66/824* (2013.01); *B29C 66/8223* (2013.01); *B29C 66/8227* (2013.01); *B29C 66/8242* (2013.01); *B29C 66/8322* (2013.01); *Y10T 29/49716* (2015.01); *Y10T 74/18832* (2015.01)

(58) Field of Classification Search
  USPC ........................................................ 156/580
  See application file for complete search history.

(56) References Cited

U.S. PATENT DOCUMENTS

| | | | |
|---|---|---|---|
| 5,468,336 | A | 11/1995 | Lotz et al. |
| 6,905,062 | B2 | 6/2005 | Wang |
| 9,835,234 | B2 * | 12/2017 | Lukes ................ F16H 19/0672 |
| 2005/0130777 | A1 | 6/2005 | Grunau et al. |
| 2011/0207567 | A1 | 8/2011 | Kaiser |

FOREIGN PATENT DOCUMENTS

| | | |
|---|---|---|
| CN | 102601997 | 7/2012 |
| DE | 2728790 A1 | 1/1979 |
| DE | 4229339 A1 | 3/1994 |
| DE | 4233929 A1 | 4/1994 |
| DE | 4405465 C2 | 1/1996 |
| DE | 19509871 | 9/1996 |
| DE | 9421884 U1 | 2/1997 |
| EP | 1834754 A2 | 9/2007 |
| GB | 2042121 | 9/1980 |
| GB | 2095365 | 9/1982 |
| JP | S5273270 | 6/1977 |
| JP | S58154478 A | 9/1983 |
| JP | S58196355 | 11/1983 |
| JP | H0340044 U | 4/1991 |
| JP | 2003156108 A | 5/2003 |
| JP | 2003226491 A | 8/2003 |
| JP | 2004058158 | 2/2004 |
| KR | 1019960000345 | 2/1996 |
| WO | WO2005059402 A1 | 6/2005 |

OTHER PUBLICATIONS

KR Office Action for KR Application No. 10-2014-0111278 dated Aug. 7, 2015 (7 pages).
CN Office Action for CN Application No. 201410437968.0 dated Jul. 1, 2016 (9 pages).
JP Decision of Grant for JP Application No. 2014-172679 dated Aug. 31, 2016 (3 pages).
JP Office Action for JP Application No. 2016101351 dated Jun. 19, 2018 (4 pages).
CN Office Action for CN Application No. 201710446684.1 dated Dec. 13, 2018 (5 pages).

* cited by examiner

TRACTION MEANS TENSIONER, VIBRATION WELDING DEVICE HAVING A TRACTION MEANS TENSIONER AS WELL AS PRODUCTION METHOD FOR A TRACTION MEANS TENSIONER

CROSS REFERENCE TO RELATED APPLICATIONS

This application is a divisional of U.S. patent application Ser. No. 14/471,155 filed Aug. 28, 2014 which claims the priority of German patent application DE 102013217272.9, filed on Aug. 29, 2013. The entire content of this priority application is incorporated herein by reference.

TECHNICAL FIELD

The present disclosure is related to a traction means/mechanism tensioner, the usage of a traction means tensioner in a welding device, a vibration welding device having a traction means tensioner, a production method for a traction means tensioner, a retrofitting method for a welding device as well as a tensioning method for a traction means.

BACKGROUND

Electrically driven vibration welding devices have been capturing the market increasingly in the past years. A vibration welding system of the vibration welding device, especially an oscillating head, is commonly driven electrically. In contrast thereto, advancing systems of the vibration welding device were operated for a long time hydraulically or rarely pneumatically. The term advancing system comprises herein all movable elements of the vibration welding device which cause that a first work piece to be welded is moved towards or threaded into a second work piece to be welded, which is arranged at the oscillating head. For example, a lifting table as element of the advancing system of the vibration welding device has been driven hydraulically for years. The usage of electrical drives, as for example a spindle drive, was critical to impossible due to the vibrations or oscillations of the vibration welding device. This is especially founded in that both of the work pieces to be welded have to be pressed against each other during the welding process itself and thus a vibration is transferred to all elements of the vibration welding device, also to the spindle drive pressing both work pieces to be welded against each other. However, the spindle drive is not designed or suited for such vibration loads so that the durability of the spindle drive is shortened respectively.

Therefore, an electrical drive for the advancing system was developed years ago by the company BRANSON, which uses a traction means, namely chains or belts. An element of the advancing system to be moved, for example the lifting table, is herein coupled to the traction means firmly. The traction means itself is moved by an appropriate drive, for example by a servomotor or an asynchronous motor. In contrast to the spindle drive, the traction means are able to absorb the oscillations produced by the oscillating head of the vibration welding device and to oscillate therewith, if necessary. As the oscillations produced by the oscillating head are transferred inevitably also to a machine frame and to the lifting table of the vibration welding device, a co-vibration of the traction means is even more important.

Especially with respect to the welding process of a vibration welding device, a force is applied to the work pieces to be welded in that the advancing system, especially the lifting table, presses the first work piece to be welded against the second work piece to be welded, which is arranged at the oscillating head. In doing so, the traction means, thus the belt or the chain, is tensioned strongly in the area of the work pieces to be welded while the tension of the traction means is released on the side opposite to the work pieces to be welded.

A general disadvantage resulting from using traction means, especially in vibration welding devices, is that the traction means is elongated with time. Such an elongation has to be compensated usually manually to avoid malfunction or increased wear.

Particularly with respect to belts, especially toothed belts, as traction means, they have to be re-tensioned in a shorter operating time compared to chains as traction means. Also, the failure source at belts exists that the tension is adjusted too high or too low. Furthermore, and based on experience, the belts rapidly lose tension especially at the beginning, thus at their first use, and have to be re-tensioned quickly.

In case it is reacted to this initially large elongation with a respectively higher pretension, this results in a hard running of the device. Accordingly, a disproportional amount of energy is required for moving the advancing system. Furthermore, the wear in the used bearings is increased, which results in turn in a shortened durability of the advancing systems.

Similar problems exist when chains are used. They don't have to be re-tensioned after such a short operating time compared to belts but chains are also elongated over time due to wear.

Furthermore, and due to the releasing of the traction means on one side, there is the disadvantage that a driving by for example a drive gear does not take place reliably any longer. Further, it is also possible that the traction means jumps out of a guide and thus a proper operation of the vibration welding device is no longer ensured. For avoiding this, a manual re-adjustment of the traction means is being done for now.

It is thus the object of the present innovations to provide a traction means tensioner by means of which an automatic re-adjustment of the tension of the traction means, especially at the usage in welding devices like vibration welding devices, is possible. Furthermore, a corresponding production method for a respective traction means tensioner shall be given.

SUMMARY

One or more objective technical problems are solved by a traction means tensioner according to patent claim 1, the usage of a traction means tensioner according to patent claim 9, a welding device according to patent claim 11, a production method of a traction means tensioner according to patent claim 13, a retrofitting method of a welding device according to patent claim 14 as well as a tensioning method for a traction means according to patent claim 16. Further preferred embodiments result from the following description, the drawings as well as the dependent patent claims.

The traction means tensioner, by means of which a traction means is tensionable, which has at least a first and a second end, preferably only two ends, comprises a first fastening means having a first fastening portion at which the first end of the traction means is fastenable, a second fastening means having a second fastening portion at which the second end of the traction means is fastenable, and a coupling means coupling the first and the second fastening means to each other so that the first and the second fastening means are movable with respect to each other and their movability is at least restricted on one side, wherein the first and the second fastening means are pre-tensionable via at least one spring element with respect to each other.

For a better understanding of the traction means tensioner, the traction means tensioner is described in the following during usage in a vibration welding device. Here, the application of the traction means tensioner is not limited to the usage in a vibration welding device but may also be used generally in welding devices as well as in all devices in which a reciprocating movement of a movable component of the device shall be caused by means of a traction means.

The exemplary vibration welding device comprises a lifting table at which the traction means tensioner is arranged. Further, the vibration welding device comprises an oscillating head, arranged at an upper end of a machine frame. The first end of the traction means is connected to the first fastening portion of the first fastening means and the second end of the traction means is connected to the second fastening portion of the second fastening means. The traction means runs from the first fastening portion of the first fastening means in the direction of the upper end of the machine frame, at which the traction means is deflected, preferably at a deflection pulley. From there, it runs in the direction of the lower end of the machine frame to a driving gear which is coupled to a motor via a shaft. From the driving gear, the traction means runs again in the direction of the upper end of the machine frame to the second fastening portion of the second fastening means. As the first and the second fastening means are coupled directly or indirectly to each other via the coupling means, the two ends of the traction means are also coupled to each other in this manner by means of an in-line arrangement of the traction means tensioner. The traction means is drivable by means of the driving gear, which is driven via the motor, so that the lifting table is movable preferably in the vertical direction.

In this embodiment, the traction means tensioner is used with a traction means, which enables a vertical reciprocation. Here, it has to be considered that the traction means tensioner cannot only be used with a traction means allowing a vertical reciprocation but with each traction means realizing a reciprocation of a component to be moved, regardless of the direction.

For adjusting an appropriate tension of the traction means before operating the vibration welding device, the first and the second fastening means are connected directly or indirectly to each other via the coupling means so that the first and the second fastening means are movable relatively to each other. In a first embodiment, only one of the two fastening means is movable while the other is stationary with respect to the coupling means. In an alternative embodiment, both fastening means are movable with respect to the coupling means. In each case, the movement of the at least one fastening means is preferably limited so that the coupling means restricts the deflection of one end of the traction means at least in one direction.

The desired or pre-determinable tension of the traction means is produced by means of the at least one spring element. The at least one spring element is chosen from the group consisting of: helical springs, spiral springs, flat springs and disc springs or a combination thereof. Therein, the at least one spring element fulfils also the object of maintaining the predetermined tension during an operation of the vibration welding device. In case an elongation of the traction means occurs during the operation, the at least one spring element then changes the position of the first and the second fastening means and thus of the first and the second end of the traction means with respect to each other so that the desired tension at the traction means is in turn readjusted or maintained. This means that the at least one spring element is pre-tensioned against a traction direction of the traction means. By means of the at least one spring element, also a first force in a first direction is applied to one of the fastening means, wherein said first force acts oppositely to a second force, wherein said second force is applied by the corresponding end of the tractions means to the respective fastening means in a second direction being opposite to the first direction. For example, the at least one spring element may be assigned to the second fastening means. The traction element applies a force to the second fastening means via the second fastening portion pulling the second fastening means away from the coupling means. The at least one spring element acts against this force and pulls the second fastening means towards the coupling means or towards the first fastening means, whereby the traction means maintains the desired tension during operation and the two fastening means are pre-tensioned with respect to each other.

An advantage of the preferred traction means tensioner is thus that the traction means may be tensioned flexibly. Further, the traction means tensioner may be constructed variably. It may also be used with a plurality of different traction means types and sizes so that it is extremely economical. Furthermore, the preferred traction means tensioner has a compact design and is especially not much wider than the traction means itself.

According to a preferred embodiment, the at least one spring element is arranged adjacent to the second fastening means and the second fastening means comprises a securing portion arranged in the coupling means. Alternatively, the at least one spring element may also be assigned to the first fastening means. In each of these embodiments it is important that by means of the assignment or adjacent arrangement of the at least one spring element to one of the fastening means, the respective fastening means is movable with respect to the coupling means. In the first preferred case, the second fastening means is thus movable with respect to the coupling means.

Further, and in case of failure of the at least one spring element, the respective fastening means does not slide out of the coupling means due to a traction of the traction means. This is achieved by the arrangement of the securing portion of the fastening means in the coupling means, which is arranged adjacent to the at least one spring element. In the first preferred case, this is also the second fastening means. The securing portion ensures a positive fit coupling of the respective fastening means with the coupling means. Especially in case of a failure of the spring element, the securing portion having the positive fit coupling to the coupling means ensures that the corresponding fastening means is not able to be released from the coupling means in traction direction of the traction means. Accordingly, and in such a case, the respective end of the traction means is further coupled to the coupling means. Thus, and for example, the vibration welding device is at least movable in emergency service into a position, in which a replacement of the at least one spring element is possible without problems.

Additionally or alternatively, a monitoring of the spring element or the fastening means arranged adjacent thereto via sensors is possible. In doing so, an operation of the traction means tensioner in a load limit range is recognisable timely so that appropriate measures like a stopping of the exemplarily vibration welding device and/or a replacement of the spring element by a spring element having the same or other characteristics may be taken.

In an especially preferred embodiment, particularly with respect to the above described embodiment, the first fastening means is stationary with respect to the coupling means. This applies especially in case the at least one spring element is arranged adjacent to the second fastening means. In case the at least one spring element is arranged adjacent to the first fastening means, the second fastening means is arranged stationary with respect to the coupling means. By means of this arrangement of a movable and a stationary fastening means with respect to the coupling means, a tension of the traction means may be adjusted especially efficient.

It is also preferred that the coupling means couples the first and the second fastening means to each other so that the first fastening portion of the first fastening means and the second fastening portion of the second fastening means are oriented in opposite axial directions. In this way, especially a continuous traction means can be replaced by a traction means having two ends without changing the remaining construction of the exemplary vibration welding device extensively. This applies correspondingly to all devices wherein the traction means is used for reciprocating an element or component.

Further, it is preferred that the coupling means comprises a regulating or adjusting portion, especially a thread, so that an initial distance between the first and the second fastening portion is pre-determinable. By means of this regulating portion, an initial position of the two fastening means with respect to each other is adjustable before fastening a respective end of the traction means to the first and the second fastening portion. This applies especially to an initial distance between the two fastening portions in case the two fastening portions are oriented by the coupling means in opposite axial directions. As described above, and during operation of the exemplary vibration welding device, an automatic re-adjustment of the desired or a predetermined tension occurs due to the at least one spring element in case of an elongation of the traction means. For further increasing the easy handling of the device, a means is provided with this embodiment by means of which the pretension of the traction means is additionally also manually re-arrangeable or re-adjustable. Thus, it is possible without great effort and besides the automatic re-adjustment of the tension of the traction means to perform a manual adjustment of the pretension without changing the components.

In a further preferred embodiment, the at least one spring element is a helical spring arranged with a first axial end at the second fastening means, especially at the second fastening portion, and with a second axial end at the coupling means so that the first and the second fastening means are pre-tensionable with respect to each other. By means of the helical spring, the desired pretension of the traction means is predetermined, for example by means of a respective choice of the material for the helical spring, the thread pitch or other characteristics. A special advantage is present in case the helical spring is arranged accessible from the outside at the coupling means as well as at the second fastening means. In case of a failure of the helical spring, it is replaceable any time easily. Preferably, at least two spiral springs are used.

In an alternative embodiment, the at least one spring element is a disc spring arranged around the second fastening element between a securing portion of the second fastening element and an opening in the coupling means so that the first and the second fastening means are pre-tensionable with respect to each other. This arrangement is, in principle, similar to a piston-cylinder-arrangement like in shock absorbers, wherein the second fastening means represents the piston and the coupling means represents the cylinder. The securing portion of the second fastening means is arranged in the coupling means and the second fastening means protrudes through the coupling means via an opening so that at least the fastening portion of the second fastening means is freely accessible. The disc spring is arranged between the securing portion and the opening of the coupling means through which the second fastening means protrudes. In this embodiment, it is especially advantageous that the disc spring is arranged protected and that a particular compactness of the traction means tensioner results. Preferably, an even plurality of disc springs is used, which are arranged alternatingly with the upper and lower side to each other.

The traction means tensioner is used in a welding device, especially in a vibration welding device, an infrared welding device, a hot plate welding device or in combinations thereof. Here, it is especially advantageous to use a chain or a belt as traction means. The respective advantages result from the above description of the traction means tensioner according to the invention and are thus not repeated here.

The welding device, especially a vibration welding device, comprises a movably arranged element, especially a lifting table, a traction means for moving the movably arranged element, especially for a reciprocating movement of the lifting table, and a traction means tensioner. Preferably, the traction means tensioner is arranged at the movably arranged element, thus especially at the lifting table. The advantages of the welding device as well as its functionality were already described above in combination with the traction means tensioner. Therefore, the advantages of such an arrangement are not repeated here.

The production method of a traction means tensioner, especially of a traction means tensioner, comprises the steps of: providing a first fastening means having a first fastening portion at which a first end of a traction means is fastenable, providing a second fastening means having a second fastening portion at which a second end of a traction means is fastenable, providing a coupling means and arranging the first and the second fastening means at the coupling means so that the first and the second fastening means are movable with respect to each other and their movability is at least restricted on one side, and arranging at least one spring element so that the first and the second fastening means are pre-tensionable with respect to each other by means of the at least one spring element. With respect to the advantages of the traction means tensioner produced in this way, it is referred to the above description of the traction means tensioner.

A retrofitting method for a welding device, especially a vibration welding device, comprises the steps of: providing a traction means tensioner, separating a continuous traction means of the welding device, especially a continuous chain or a continuous belt, so that the traction means has two ends, coupling the first end of the traction means to the first fastening portion of the first fastening means of the traction means tensioner, coupling the second end of the traction means to the second fastening portion of the second fastening means of the traction means tensioner, and arranging the coupling means of the traction means tensioner at the welding device, especially at an element of the welding device which is movable by means of the traction means. In a preferred embodiment, the method comprises the further step of: adjusting a pretension of the traction means by means of adjusting the distance between the first fastening portion of the first fastening means and the second fastening portion of the second fastening means, especially by means of a regulating portion of the coupling means.

By means of the retrofitting method, any welding device having an element which is movably arranged by means of a traction means may be provided with the traction means tensioner. The advantages resulting therefrom were already described in combination with the traction means tensioner so that they are not repeated here.

A tensioning method for a traction means having at least a first and a second end comprises the following steps of: connecting the first and the second end of the traction means via a coupling means so that the first and the second end of the traction means are movable with respect to each other and their movability is at least restricted on one side, arranging at least one spring element so that the first and the second end of the traction means are pre-tensionable with respect to each other, and changing a relative distance between the first and the second end of the traction means, which are connected via the coupling means so that the traction means is pre-tensioned by means of a spring pre-tension between the first and the second end.

With the tensioning method, a traction means having at least two ends may be tensioned effectively, especially when using the traction means tensioner. With respect to the different advantages, it is thus referred to the above statements for the traction means tensioner according to the invention to avoid repetitions.

In a preferred embodiment of the tensioning method, the step of connecting the first and the second end of the traction means via a coupling means comprises the steps of: coupling the first end of the traction means to a first fastening means coupled to the coupling means, coupling the second end of the traction means to a second fastening means coupled to the coupling means, wherein the first and the second fastening means are movable with respect to each other and their movability is at least restricted on one side so that a relative distance between the first and the second end of the traction means is adjustable. Further, it is preferred that the first and/or the second fastening means are coupled to the coupling means by means of a positive fit so that a protection against a releasing of the first and/or the second end of the traction means from the coupling means is formed, especially in a traction direction of the traction means. Also, and with respect to this preferred embodiment of the tensioning method, it is referred to the statements for the traction means tensioner according to the invention.

BRIEF DESCRIPTION OF THE DRAWINGS

In the following, embodiments and implementations of the present invention are described in detail with reference to the accompanying drawings. Same reference numbers in the drawings denote the same parts or components. It shows.

DETAILED DESCRIPTION

The traction means (i.e. traction mechanism) tensioner according to at least some implementations of the invention is described in the following on the basis of the usage in a vibration welding device. This usage is, however, not restrictive as the traction means tensioner according to the invention may be used in any device or machine in which a reciprocating movement of a component shall be caused by means of a traction means. Especially, a continuous traction means which solely causes a reciprocating movement of a component may be replaced by a traction means (i.e. traction mechanism) having two ends combined with the traction means tensioner according to the invention.

Figure 1:
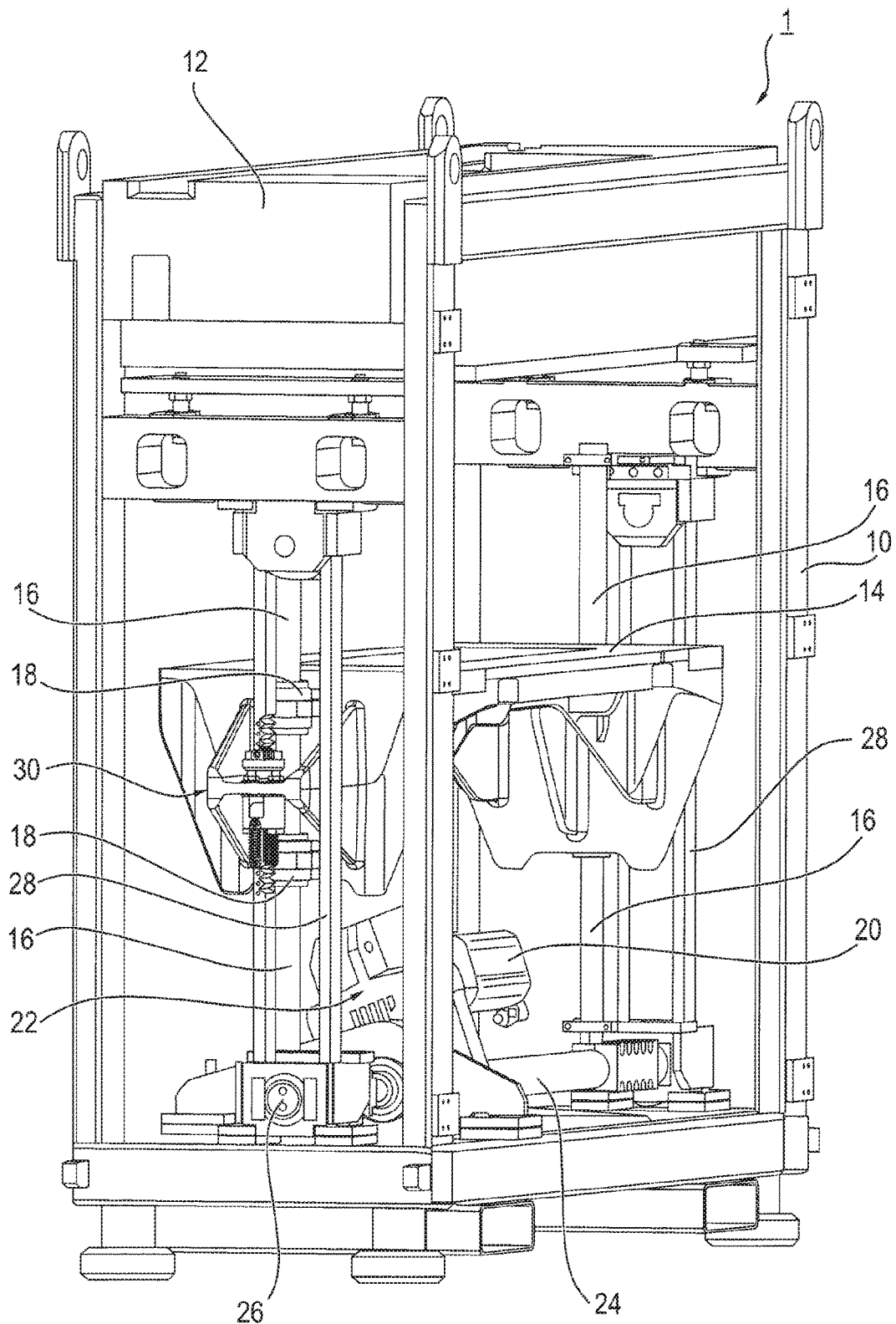
FIG. 1 shows a vibration welding device according to a first embodiment of a traction means tensioner according to the invention.
Figure 2:
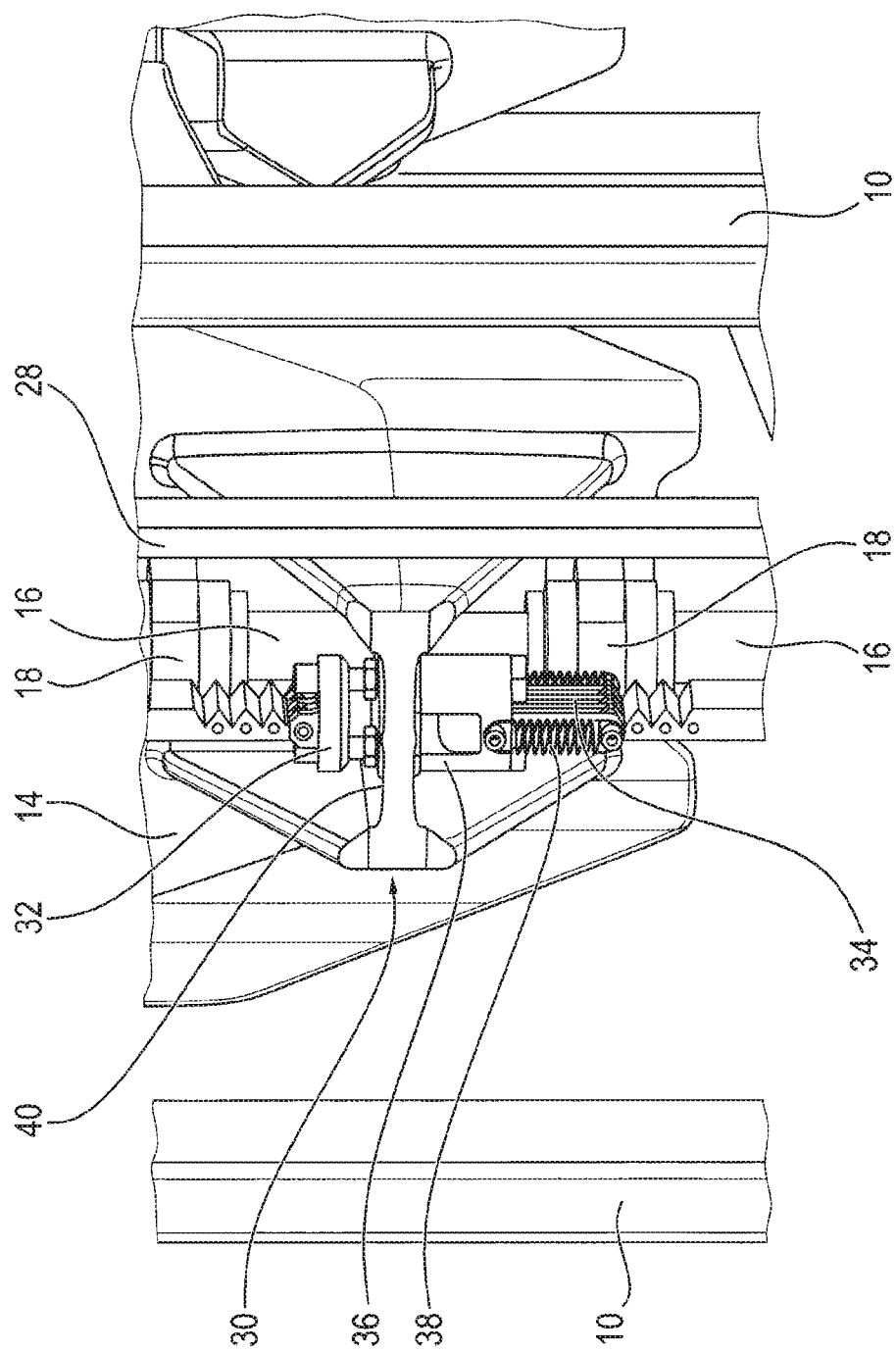
FIG. 2 shows a section of the vibration welding device of FIG. 1.
Figure 3:
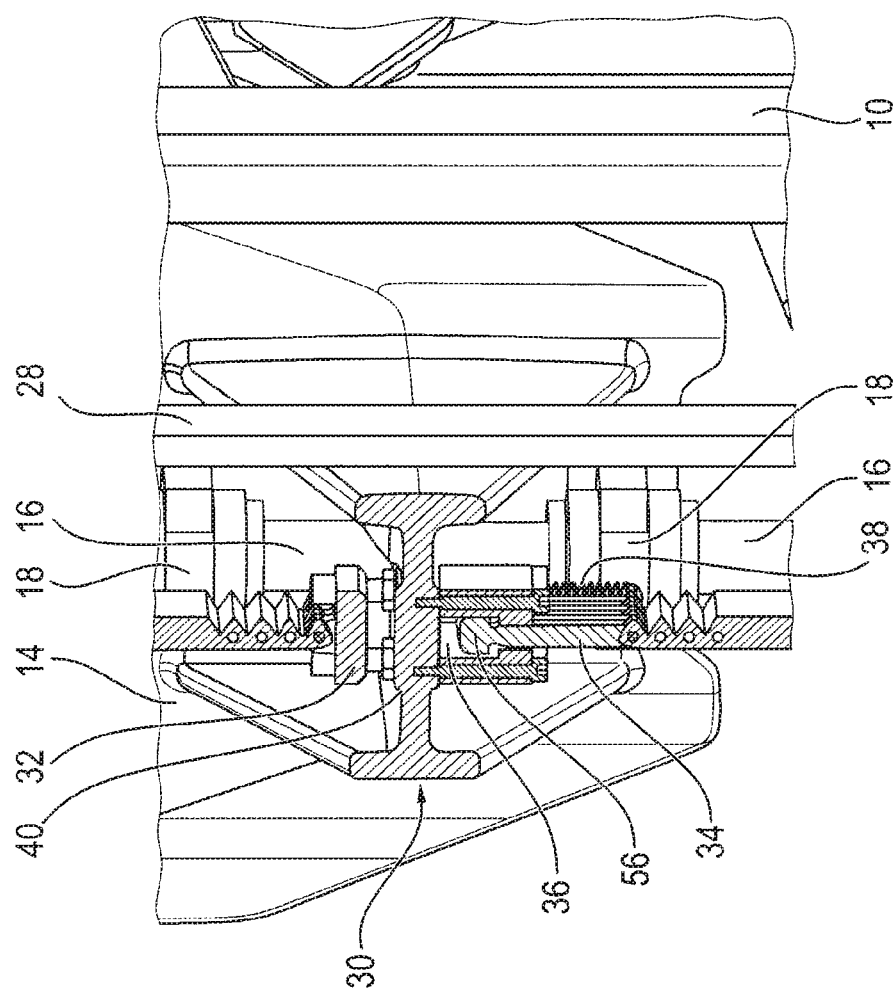
FIG. 3 shows a side view of the vibration welding device of FIG. 2.
Figure 4:
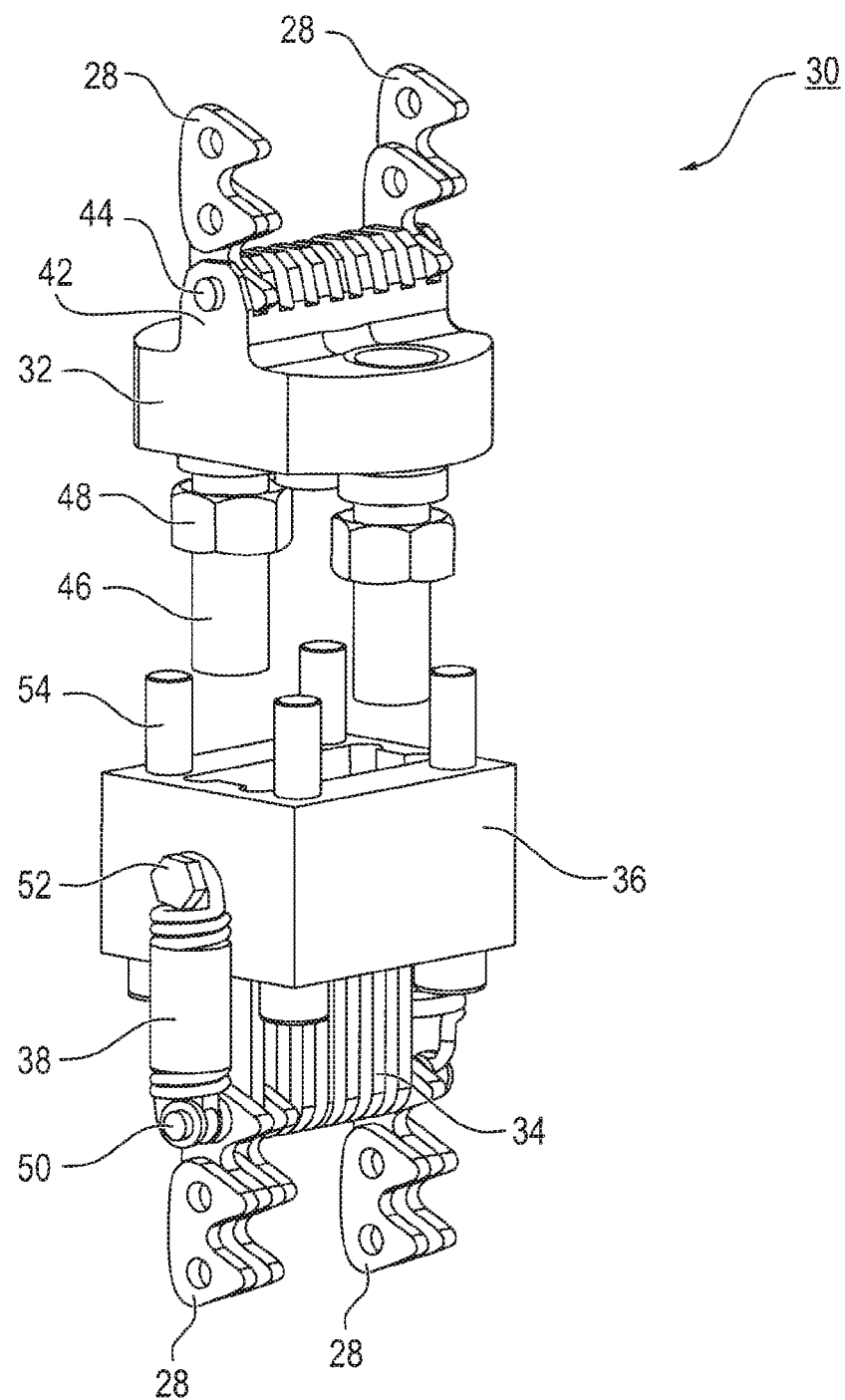
FIG. 4 shows the first embodiment of the traction means tensioner according to the invention.
Figure 5:
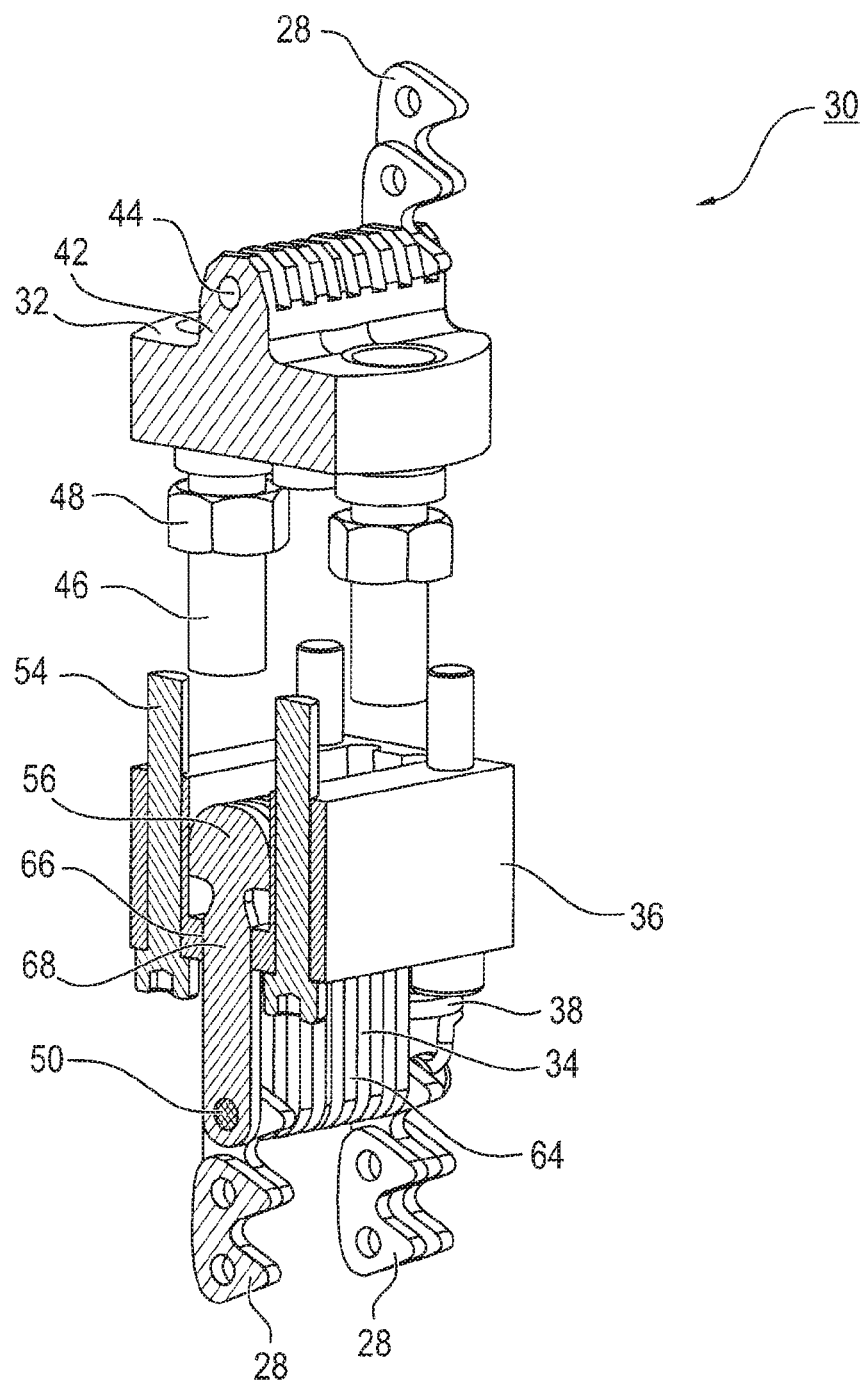
FIG. 5 shows a side view of the traction means tensioner of FIG. 4.

Now, and with reference to FIG. 1, a vibration welding device 1 is depicted. The vibration welding device 1 comprises a machine frame 10 having an oscillating head 12 and a lifting table 14. The lifting table 14 is guided in vertical direction by columns 16 and bearing bushings 18. During operation of the vibration welding device 1, one work piece to be welded is arranged on the lifting table 14 and the oscillating head 12, respectively. For moving the lifting table 14 in the direction of the oscillating head 12 and for applying a force to the two work pieces to be welded during the welding process itself, a motor 20 having a gear 22 is provided. The motor drives a shaft 24 via the gear 22, wherein two driving gears 26 are arranged at the shaft 24. Each of the driving gears 26 is in engagement with a respective traction means 28. The traction means 28 may be a chain or a belt, especially a toothed belt.

Further, a first embodiment of the traction means tensioner 30 according to the invention is recognizable in FIG. 1. Now, and with reference to FIGS. 2 to 5, the traction means (i.e. traction mechanism) 28 is arranged with a first end at the first fastening portion 42 of the first fastener (e.g. first fastening means) 32. This arrangement takes place especially by means of a fastening pin 44. Likewise, the second end of the traction means 28 is arranged at the second fastening portion of the second fastener (e.g. second fastening means) 34 via a fastening pin 50. In this case, the coupling mechanism or means has a receiving mechanism or means 36, which comprises in the depicted case in turn four screws 54, and a retaining mechanism or means 40. On the one side of the retaining means 40, the first fastener 32 is fastened stationary by means of the screws 46 and the locknuts 48. At the opposite side of the retaining means 40, the receiving means 36 is fixed. In this manner, a connection to the lifting table 14 is created via the retaining means 40.

A movement of the second fastening means 34 is thus limited by means of the retaining means 40 in a first axial direction and by means of a securing portion 56 of the second fastening means 34 in combination with the opening in the receiving part 36 in a second axial direction. The securing portion 56 forms thus a positive fit coupling in combination with the opening 66 in the receiving part 36.

For this purpose, the securing portion 56 has a larger lateral extension as a following web 68 being adapted in its width to the opening 66 in the receiving means 36. In this manner, the second fastening means 34 is axially movably arranged and retained at least partly in the receiving means 36.

When using the traction means tensioner 30, the tension of the traction means 28 is predetermined by means of appropriate elastic tension elements, here the helical springs 38, which are mounted to the second end of the traction means or the second fastening portion of the second fastening means 34 and the receiving means 36. To this end, two holders 52 for a first axial end of the helical springs 38 are provided at the receiving means 36. The second axial end of the helical springs 38 is arranged at the fastening pin 50. Even in case of failure of one or both helical springs 38, the fastening means 34 is not able to be released from the receiving means 36, especially not able to slide out or to be pulled out.

Preferably, helical springs are used in this embodiment, wherein certainly also other spring elements are conceivable, which produce a tension and a reset force. The spring force of the spring elements has to be chosen so that on the one hand an appropriate tension is created. On the other hand, the spring element may not be overstressed during the welding process so that the tension thereof is lost.

Figure 6:
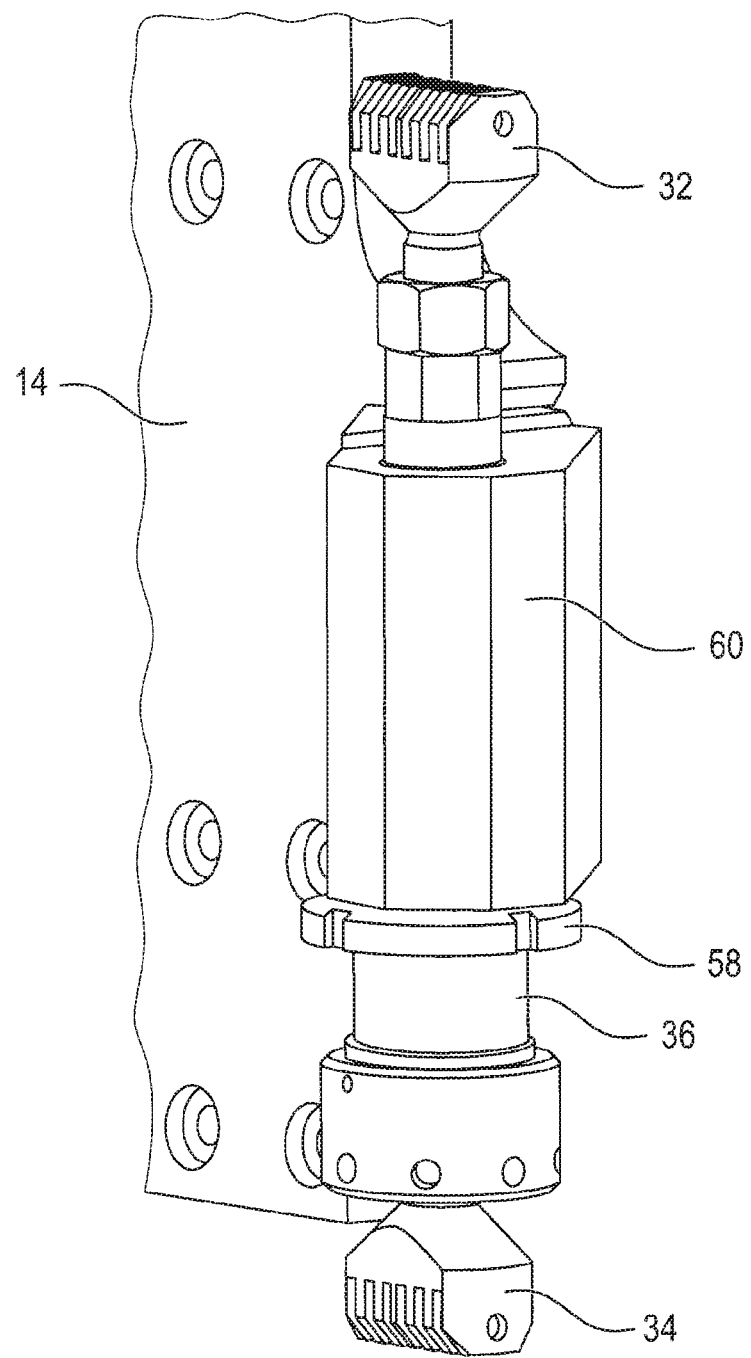
FIG. 6 shows a second embodiment of the traction means tensioner according to the invention.
Figure 7:
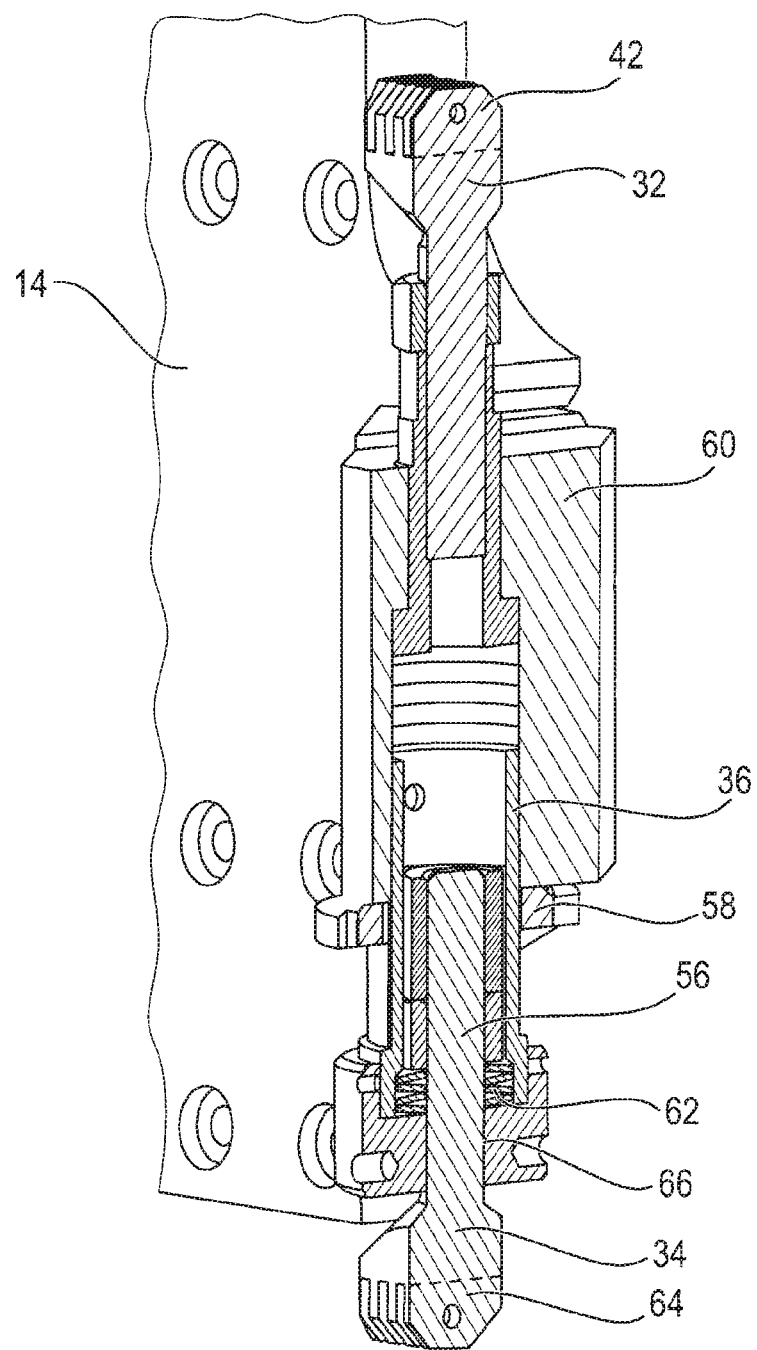
FIG. 7 shows a side view of the traction means tensioner according to the invention of FIG. 6.

An alternative embodiment is shown in FIGS. 6 and 7. Herein, the coupling means or coupler has an elongated housing 60, in which the receiving means or receiver 36 is arranged on the one side and the first fastening means 32 is arranged on the opposite side. FIG. 7 shows a respective sectional view. In the receiving means 36, disc springs 62 as spring elements are arranged between a securing portion 56 of the second fastening means 34 and an opening 66 of the receiving means 36. Here, too, the securing portion 56 comprises a larger diameter as the opening 66, similar to the above described first embodiment. The second fastening means 34 protrudes through the opening 66 with a portion having a smaller diameter, which follows the securing portion 56 and which then passes over into the second fastening portion 64. The disc springs 62 are four disc springs 62, which are arranged respectively alternatingly with their upper and their lower side to each other.

It can be seen that the receiving means 36 is retained in the housing 60 by means of a thread. Via the thread in the housing 60, a relative distance of the first 42 and the second fastening portion 64 to each other can be adjusted, whereby, in case the traction means 28 is coupled to the respective fastening portion 42, 64, a pretension for the traction means 28 is adjustable. For this reason, the portion having the thread is also denominated as regulating or adjusting portion. A position of the receiving means 36 in the housing 60 is fixed by means of a locking nut 58. Thus, a pretension is adjustable. Furthermore, and besides the automatic tension maintaining due to the disc springs 62, a manual re-adjustment of the pretension of the traction means 28 may be achieved in this manner by releasing the locking nut 58, adjusting the distance between the two fastening portions 42, 64 via the regulating portion and tightening the locking nut 58.

The first fastening means 32 may be arranged at least partly in the housing 60 in a positive fit and/or a non-positive fit manner, as shown in FIGS. 6 and 7. For example, it may be arranged therein loosely, it may be coupled thereto rigidly or it may be coupled thereto via the thread. Due to the enlargement of the first fastening means 32 at the end axially opposite to the first fastening portion, the first fastening means cannot be pulled out of the housing, especially not by the traction means.

Figure 10:
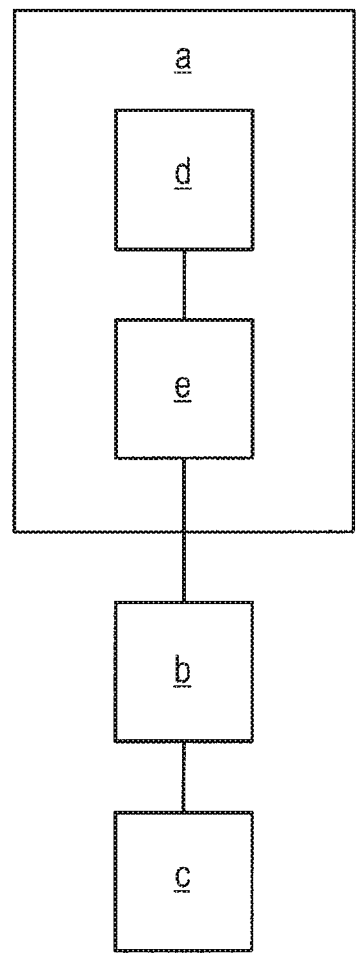
FIG. 10 shows a schematic course of the procedure for a tensioning method according to the invention.

The tensioning method realised by the traction means tensioner can be described with respect to FIG. 10 as follows. In a first step a, the first and the second end of the traction means 28 are coupled via the coupling means so that the first and the second end of the traction means 28 are movable with respect to each other and at least restricted on one side. The coupling of step a comprises therein two steps. In step d, the first end of the traction means 28 is coupled to the first fastening means 32, and in step e, the second end of the traction means 28 is coupled to the second fastening means 34. The first 32 and the second fastening means 34 are coupled to the coupling means. In this way, the first 32 and the second fastening means 34 and thus also the first and the second end of the traction means 28 are movable with respect to each other and at least restricted on one side so that a relative distance between the first and the second end of the traction means 28 is adjustable. The steps d and e may be performed in any order. Preferably, the first 32 and/or the second fastening means 34 are coupled to the coupling means with a positive fit so that a protection against a releasing of the first and/or the second end of the traction means 28 from the coupling means is formed, especially in a traction direction of the traction means 28.

In step B, the arrangement of at least one spring element 38; 62 follows so that the first and the second end of the traction means 28 are pre-tensionable with respect to each other. Finally, in step c the changing of a relative distance between the first and the second end of the traction means 28 follows, which are coupled via the coupling means, so that the traction means 28 is pre-tensioned via a spring pretension between the first and the second end.

Figure 8:
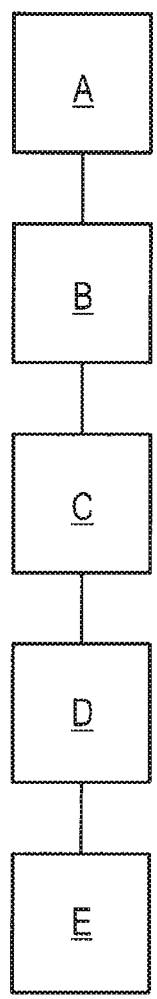
FIG. 8 shows a schematic course of the procedure for a production method according to the invention for a traction means tensioner.

The production method according to the invention for a traction means tensioner is now described with reference to FIG. 8. In a step A, the first fastening means is provided having the first fastening portion at which the first end of the traction means is fastenable. In step B, the second fastening means is provided having a second fastening portion at which the second end of the traction means is fastenable. In step C, a coupling means is provided. The steps A to C may be performed in any order.

Arranging the first and the second fastening means at the coupling means is performed in step D so that the first and the second fastening means are movable with respect to each other and at least restricted on one side. Further, and in step E, arranging of the at least one spring element is performed so that the first and the second fastening means are pre-tensionable with respect to each other via the at least one spring element. In this way, the traction means tensioner according to the invention is produced, whereby it comprises all of the above described advantages.

Figure 9:
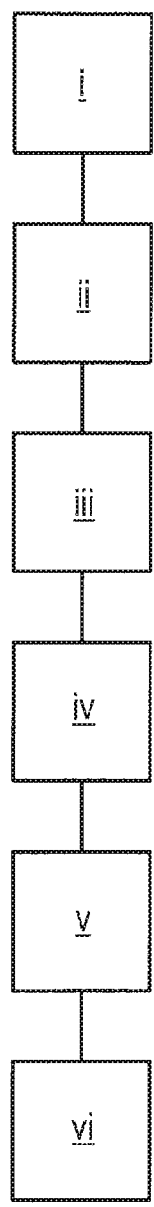
FIG. 9 shows a schematic course of the procedure for a retrofitting method according to the invention.

Now referring to FIG. 9, the retrofitting method according to the invention is described. In step i, the traction means tensioner according to the invention is provided. Separating the traction means of the welding device, especially a continuous chain or a continuous belt, so that the traction means comprises two ends takes place in step ii. The order of the two steps i and ii is arbitrary.

Now, and in step iii, the coupling of the first end of the traction means to the first fastening portion of the first fastening means of the traction means tensioner takes place, and in step iv, the coupling of the second end of the traction means to the second fastening portion of the second fastening means of the traction means tensioner is performed. Further, and in step v, the coupling means of the traction means tensioner is arranged at the welding device, especially at an element of the welding device which is movable by means of the traction means. The order of the steps iii to v is also arbitrary. Preferably, the adjustment of the pretension of the traction means by means of adjusting the distance between the first fastening portion of the first fastening means and the second fastening portion of the second fastening means takes place as last step vi, especially by means of the regulating portion of the coupling means. In this way, a common welding device is provided with the traction means tensioner according to the invention and thus comprises all of the above described advantages.

Further forms—the following numbered paragraphs and sentences further describe forms that may be carried out independently or in various combinations.

1. In at least some implementations, a traction means tensioner by means of which a traction means is tensionable, which has at least a first and a second end, preferably only two ends, comprises:
   a) a first fastening means (32) having a first fastening portion (42) at which the first end of the traction means (28) is fastenable,
   b) a second fastening means (34) having a second fastening portion (64) at which the second end of the traction means (28) is fastenable, and
   c) a coupling means coupling the first (32) and the second fastening means (34) to each other so that the first (32) and the second fastening means (34) are movable with respect to each other and their movability is at least restricted on one side, wherein
   d) the first (32) and the second fastening means (34) are pre-tensionable with respect to each other via at least one spring element (38; 62).

2. Traction means tensioner (30) according to form 1, wherein the at least one spring element (38; 62) is arranged adjacent to the second fastening means 34 and the second fastening means (34) comprises a securing portion (56) arranged in the coupling means.

3. Traction means tensioner (30) according to one or more of the preceding forms, wherein the first fastening means (32) is stationary with respect to the coupling means.

4. Traction means tensioner (30) according to one or more of the preceding forms, wherein the coupling means couples the first (32) and the second fastening means (34) to each other so that the first fastening portion (42) of the first fastening means (32) and the second fastening portion (64) of the second fastening means (34) are oriented in opposite axial directions.

5. Traction means tensioner (30) according to one or more of the preceding forms, wherein the coupling means comprises a regulating portion, especially a thread, so that a position of the first fastening portion (42) with respect to the second fastening portion (64) is adjustable, especially a distance between the first (42) and the second fastening portion (64).

6. Traction means tensioner (30) according to one or more of the preceding forms, wherein the at least one spring element (38; 62) is chosen from the group consisting of: helical springs (38), spiral springs, flat springs and disc springs (62) or a combination thereof.

7. Traction means tensioner (30) according to one or more of the preceding forms, wherein the at least one spring element (38) is a helical spring arranged with a first axial end at the second fastening means (34), especially at the second fastening portion (64), and with a second axial end at the coupling means so that the first (32) and the second fastening means (34) are pre-tensionable with respect to each other.

8. Traction means tensioner (30) according to one or more of the forms 1 to 6, wherein the at least one spring element (62) is a disc spring arranged around the second fastening element (34) between a securing portion (56) of the second fastening element (34) and an opening in the coupling means so that the first (32) and the second fastening means (34) are pre-tensionable with respect to each other.

9. Usage of a traction means tensioner (30) according to one or more of the forms 1 to 8 in a welding device, especially in a vibration welding device 1, an infrared welding device, a hot plate welding device or in combinations thereof.

10. Usage of a traction means tensioner (30) according to form 9, wherein the traction means tensioner (30) is used with a chain or a belt as traction means (28).

11. Welding device, especially a vibration welding device 1, comprising
   a) a movably arranged element, especially a lifting table (14),
   b) a traction means (28) for moving the movably arranged element, especially for a reciprocating movement of the lifting table (14), and
   c) a traction means tensioner (30) according to one of the forms 1 to 8 being coupled via a first fastening portion (42) to a first end of the traction means (28) and via a second fastening portion (64) to the second end of the traction means (28).

12. Welding device according to form 11, wherein the traction means tensioner (28) is arranged at the movably arranged element, especially at the lifting table (14), by means of the coupling means.

13. Production method of a traction means tensioner, especially of a traction means tensioner (30) according to one or more of the forms 1 to 8, wherein the production method comprises the steps of:
   a) providing (A) a first fastening means (32) having a first fastening portion (42) at which a first end of a traction means (28) is fastenable,
   b) providing (B) a second fastening means (34) having a second fastening portion (64) at which a second end of a traction means (28) is fastenable,
   c) providing (C) a coupling means and arranging (D) the first (32) and the second fastening means (34) at the coupling means so that the first (32) and the second fastening means (34) are movable with respect to each other and their movability is at least restricted on one side, and
   d) arranging (E) at least one spring element (38; 62) so that the first (32) and the second fastening means (34) are pre-tensionable with respect to each other via the at least one spring element (38; 62).

14. Retrofitting method for a welding device, comprising the steps of:
   a) providing (i) a traction means tensioner (30) according to one or more of the forms 1 to 8,
   b) separating (ii) a traction means (28) of the welding device, especially a continuous chain or a continuous belt, so that the traction means (28) has two ends,
   c) coupling (iii) the first end of the traction means (28) to the first fastening portion (42) of the first fastening means (32) of the traction means tensioner (30),
   d) coupling (iv) the second end of the traction means (28) to the second fastening portion (64) of the second fastening means (34) of the traction means tensioner (30), and
   e) arranging (v) the coupling means of the traction means tensioner (30) at the welding device, especially at an element of the welding device which is movable by means of the traction means.

15. Retrofitting method of a welding device according to form 14, comprising the further step of:

f) adjusting a pretension of the traction means (28) by means of adjusting the distance between the first fastening portion (42) of the first fastening means (32) and the second fastening portion (64) of the second fastening means (34), especially by means of a regulating portion of the coupling means.

16. Tensioning method for a traction means (28) having at least a first and a second end, comprising the following steps of:

a) connecting (a) the first and the second end of the traction means (28) via a coupling means so that the first and the second end of the traction means (28) are movable with respect to each other and their movability is at least restricted on one side, b) arranging (b) at least one spring element (38; 62) so that the first and the second end of the traction means (28) are pre-tensionable with respect to each other, and c) changing (c) a relative distance between the first and the second end of the traction means (28), which are connected via the coupling means so that the traction means (28) is pre-tensioned via a spring pretension between the first and the second end.

17. Tensioning method according to form 16, wherein the step of connecting the first and the second end of the traction means (28) via a coupling means comprises the steps of:

d) coupling (d) the first end of the traction means (28) to a first fastening means (32) coupled to the coupling means, e) coupling (e) the second end of the traction means (28) to a second fastening means (34) coupled to the coupling means, wherein f) the first (32) and the second fastening means (34) are movable with respect to each other and at least restricted on one side so that a relative distance between the first and the second end of the traction means (28) is adjustable.

18. Tensioning method according to form 17, wherein the first (32) and/or the second fastening means (34) are coupled to the coupling means so that a protection against a releasing of the first and/or the second end of the traction means (28) from the coupling means is formed, especially in a traction direction of the traction means (28).

The invention claimed is:

1. Production method of a traction mechanism tensioner, wherein the production method comprises the steps of:
   a) providing a first fastener having a first fastening portion at which a first end of a traction mechanism is fastenable,
   b) providing a second fastener having a second fastening portion at which a second end of a traction mechanism is fastenable, and
   comprising the steps of:
   c) providing a coupler comprising a receiving mechanism in which the second fastener is at least partly received and a retaining mechanism for a connection to a movably arranged element and arranging the first and the second fasteners at the coupler so that the first and the second fasteners are movable with respect to each other and their movability is at least restricted on one side wherein the first fastener is stationary with respect to the coupler and the second fastener comprises a securing portion arranged in the coupler, and
   d) arranging at least two helical spring elements with a first axial end at the outside of the receiving mechanism and with a second axial end at a second fastening portion of the second fastener so that the first and the second fasteners are pre-tensionable with respect to each other via the at least two helical spring elements,
   or comprising the steps of:
   e) providing a coupler and arranging the first and the second fasteners at the coupler so that the first and the second fasteners are movable with respect to each other and their movability is at least restricted on one side, wherein the coupler comprises an elongated housing for a connection to a movably arranged element, in which a receiving mechanism is arranged on the one side and the first fastener is arranged on the opposite side and the second fastener is at least partly received in the receiving mechanism, and
   f) arranging at least one disc spring element around the second fastener between a securing portion of the second fastener, which is arranged in the receiving mechanism, and an opening in the coupler so that the first and the second fasteners are pre-tensionable with respect to each other via the at least one disc spring element.

2. Retrofitting method for a welding device, comprising the steps of:
   a) providing a traction mechanism tensioner by which a traction mechanism is tensionable, which has at least a first and a second end, comprising,
      i) a first fastener having a first fastening portion at which the first end of the traction mechanism is fastenable,
      ii) a second fastener having a second fastening portion at which the second end of the traction mechanism is fastenable, and
      iii) a coupler coupling the first and the second fasteners to each other so that the first and the second fasteners are movable with respect to each other and their movability is at least restricted on one side, wherein
      iv) the first fastener is stationary with respect to the coupler, and wherein
      v) the coupler is configured either
         a) to comprise a receiving mechanism in which the second fastener is at least partly received and a retaining mechanism for a connection to a movably arranged element, wherein the first and the second fasteners are pre-tensionable with respect to each other via at least two helical spring elements, wherein the at least two helical spring elements are arranged with a first axial end at the outside of the receiving mechanism and with a second axial end at a second fastening portion of the second fastener and the second fastener comprises a securing portion arranged in the coupler, or
         b) to have an elongated housing for a connection to a movably arranged element, in which a receiving mechanism is arranged on the one side and the first fastener is arranged on the opposite side and the second fastener is at least partly received in the receiving mechanism, wherein the first and the second fasteners are pre-tensionable with respect to each other via at least one disc spring element arranged around the second fastener between a securing portion of the second fastener arranged in the receiving mechanism and an opening in the coupler,
   b) separating a traction mechanism of the welding device, so that the traction mechanism has two ends, c) coupling the first end of the traction mechanism to the first fastening portion of the first fastener of the traction mechanism tensioner, d) coupling the second end of the traction mechanism to the second fastening portion of the second fastener of the traction mechanism tensioner, and e) arranging the coupler of the traction mechanism tensioner at the welding device.

3. Retrofitting method of a welding device according to claim 2, wherein the coupler is configured to have the elongated housing for the connection to the movably arranged element, and comprising the further step of:

f) adjusting a pretension of the traction mechanism by adjusting the distance between the first fastening portion of the first fastener and the second fastening portion of the second fastener, by a regulating portion of the coupler.

4. Tensioning method for a traction mechanism having at least a first and a second end and comprising:

i) a first fastener having a first fastening portion at which the first end of the traction mechanism is fastenable, ii) a second fastener having a second fastening portion at which the second end of the traction mechanism is fastenable, and iii) a coupler coupling the first and the second fasteners to each other so that the first and the second fasteners are movable with respect to each other and their movability is at least restricted on one side, wherein iv) the first fastener is stationary with respect to the coupler, and wherein v) the coupler is configured to either a) to comprise a receiving mechanism in which the second fastener is at least partly received and a retaining mechanism for a connection to a movably arranged element, wherein the first and the second fasteners are pre-tensionable with respect to each other via at least two helical spring elements, wherein the at least two helical spring elements are arranged with a first axial end at the outside of the receiving mechanism and with a second axial end at a second fastening portion of the second fastener and the second fastener comprises a securing portion arranged in the coupler, or b) to have an elongated housing for a connection to a movably arranged element, in which a receiving mechanism is arranged on the one side and the first fastener is arranged on the opposite side and the second fastener is at least partly received in the receiving mechanism, wherein the first and the second fasteners are pre-tensionable with respect to each other via at least one disc spring element arranged around the second fastener between a securing portion of the second fastener arranged in the receiving mechanism and an opening in the coupler, the tensioning method comprising the following steps of:

a) connecting the first and the second end of the traction mechanism via the coupler so that the first and the second end of the traction mechanism are movable with respect to each other and their movability is at least restricted on one side, b) arranging the at least two helical spring elements or the at least one disc spring element so that the first and the second end of the traction mechanism are pre-tensionable with respect to each other, and c) changing a relative distance between the first and the second end of the traction mechanism, which are connected via the coupler so that the traction mechanism is pre-tensioned via a spring pretension between the first and the second end.

5. Tensioning method according to claim 4, wherein the step of connecting the first and the second end of the traction mechanism via a coupler comprises the steps of:

d) coupling the first end of the traction mechanism to a first fastener coupled to the coupler, e) coupling the second end of the traction mechanism to a second fastener coupled to the coupler, wherein f) the first and the second fasteners are movable with respect to each other and at least restricted on one side so that a relative distance between the first and the second end of the traction mechanism is adjustable.

6. Tensioning method according to claim 5, wherein the first and/or the second fastener are coupled to the coupler so that a protection against a releasing of the first and/or the second end of the traction mechanism from the coupler is formed.

7. Retrofitting method according to claim 2, wherein the coupler couples the first and the second fasteners to each other so that the first fastening portion of the first fastener and the second fastening portion of the second fastener are oriented in opposite axial directions.

8. Retrofitting method according to claim 2, wherein the coupler is configured to have the elongated housing for connection to the movably arranged element and wherein coupler comprises a regulating portion so that a position of the first fastening portion with respect to the second fastening portion is adjustable.

* * * * *